United States Patent [19]

Roetling et al.

[11] 3,999,988
[45] Dec. 28, 1976

[54] METHOD FOR REAL-TIME COLOR MASKING

[75] Inventors: Paul G. Roetling, Ontario; Dorian Kermisch, Penfield, both of N.Y.

[73] Assignee: Xerox Corporation, Stamford, Conn.

[22] Filed: July 29, 1974

[21] Appl. No.: 492,634

[52] U.S. Cl. .................... 96/1.2; 96/1.1; 96/44; 350/174
[51] Int. Cl.² .................... G03G 13/01
[58] Field of Search .................... 96/1.1, 1.2, 44; 350/174

[56] References Cited
UNITED STATES PATENTS

| | | | |
|---|---|---|---|
| 2,724,737 | 11/1955 | Hogan | 350/174 |
| 3,085,469 | 4/1963 | Carlson | 96/27 E |
| 3,667,841 | 6/1972 | Ross | 96/1.2 |
| 3,690,756 | 9/1972 | Smith | 96/1.2 |
| 3,704,061 | 11/1972 | Travis | 350/174 |
| 3,715,209 | 2/1973 | Gundlach | 96/1.2 |
| 3,716,359 | 2/1973 | Sheridon | 96/1.1 |

*Primary Examiner*—David Klein
*Assistant Examiner*—Judson R. Hightower
*Attorney, Agent, or Firm*—James J. Ralabate; John B. Mitchell; John H. Faro

[57] ABSTRACT

A method of real-time color masking is disclosed wherein pairs of color filters are inserted at specific locations in the optical paths of an electro-optical image multiplication system to thereby produce a modulated radiation pattern representative of the product of the reflectance of the positive of one color component and the negative of other color components of the original.

20 Claims, 3 Drawing Figures

METHOD FOR REAL-TIME COLOR MASKING

BACKGROUND OF THE INVENTION

This invention relates generally to color masking and specifically to such systems which employ the multiplication capabilities of electro-optical imaging devices to achieve in real-time that which is usually a relatively time consuming process.

Color copying has become increasingly important in recent years because of changes in public acceptance of, and demand for, color information. The pressures created by these demands have resulted in numerous technological advances in the color reproduction arts, among which is that set forth in the instant disclosure.

Due to the inability of readily available and economic dyes to adequately reflect colors, it is necessary that some compensation or color correction be made to reduce the amount of specific pigments in specific areas — a compensation which is most often accomplished by the process known as color masking. Many color masking techniques are known in the art as, for example, those described in *The Focal Encyclopedia of Photography*, Vol. II, pp. 921–927, W. & J. Mackay & Co., Ltd., Chatham, England, 1965, or by Yule in *Principles of Color Reproduction*, John Wiley & Sons, Inc., New York, 1967. These techniques include the well known photographic process of masking color separation negatives or positives, with other negatives or positives to vary the density of the specific color components.

Additional related techniques include the use of electronic color scanners which simultaneously or individually produce color separations. These devices scan the subject along very narrow lines using a small light beam and, through lenses and electronic gear obtain all of the information needed to separate colors and make such corrections as are necessary.

As mentioned above, the instant invention employs a broad class of imaging members which record optical images by an imagewise distribution of photogenerated voltages or current acting upon a voltage or current-alterable recording medium. Typically, in these members, imagewise activating radiation incident on a photoconductor allows charge carriers to move in an external electric field. These charge carriers interact with a voltage or current-sensitive member which in turn modulates light.

U.S. Pat. No. 2,896,507 describes an imaging member which includes a photoconductive layer on an elastically deformable layer sandwiched between a pair of electrodes, one of which is a thin metallic layer overlying the deformable layer. In operation, imagewise activating radiation is directed upon the member and an electrical field is established across the photoconductive and deformable layers thus causing these layers to deform in image configuration. The member is described as being capable of functioning as an image intensifier since the deformation image may then be read out with a high intensity light source and a Schlieren-type optical system.

Recently, a major advance in the art was made by Sheridon who disclosed the Ruticon (derived from the Greek words "rutis" for wrinkle and "icon" for image) family of imaging member wherein the voltage sensitive light modulating recording medium comprises a deformable elastomer layer and a photoconductive material may be provided as a separate layer or incorporated in the elastomer layer. For a detailed description of the Ruticon devices, see *IEEE Transactions On Electron Devices*, September 1972, and U.S. Pat. No. 3,716,359. Various different embodiments for establishing an electric field across the elastomer layer are described.

Sheridon discloses (U.S. Pat. No. 3,716,359) several embodiments of electro-optical imaging members and several variations upon ther useful application. The instant invention employs these members in a novel fashion to achieve results comparable to prior art color masking techniques.

SUMMARY OF THE INVENTION

It is therefore an object of this invention to provide a novel color masking system which is both simple and sensitive, without the complexities of the prior art.

It is a further object of this invention to provide a novel color masking system which employs optical recorders to achieve in real time that which the prior art has been able to accomplish only through multiple-step, or other time consuming processes.

It is a still further object of this invention to provide a color masking system which advantageously employs the image multiplication capabilities of electro-optical recorders.

It is an even still further object of this invention to provide a reusable color masking system with the real-time capability of multiplying the transmittance of the positive of an original color component with the negative of another.

These and other objects are accomplished by providing a method of real-time color masking wherein pairs of color filters are inserted at specific locations in the optical paths of an electro-optical image multiplication system to thereby produce a modulated radiation pattern representative of the product of the reflectance of the positive of one color component and the negative of other color components of the original.

BRIEF DESCRIPTION OF THE DRAWINGS

The advantages of this invention will become apparent upon consideration of the following detailed disclosure of the invention, especially when taken in conjunction with the accompanying drawings wherein.

DESCRIPTION OF THE PREFERRED EMBODIMENTS

As explained in the above-described U.S. Pat. No. 3,716,359 and publications, Ruticon imaging members can be made to store images and/or to display them in real-time. Furthermore, the image output sense can be either positive or negative, depending upon a simple change in Schlieren system geometry. These properties can be advantageously employed to produce a real-time color masking system which compensates for non-ideal inks or dyes. All of the embodiments and materials described in the Sheridon patent are suitable for use in this invention and are intended to be emcompassed herein.

The term "real-time" as used in relation to the disclosed invention means basically that response times (process periods) are minimal or substantially instantaneous. This is contrary to operations which require minutes or hours for completion.

Figure 1:
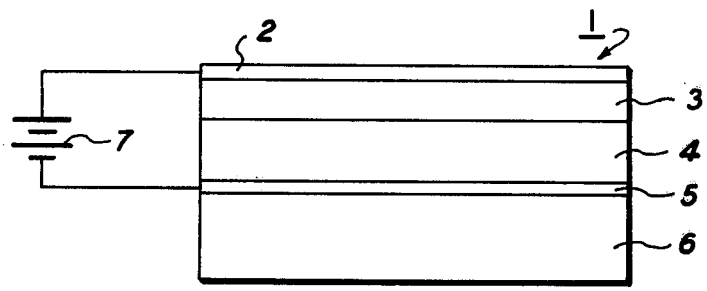
FIG. 1 is a partially schematic, partially cross-sectional view of an optical recorder suitable for use in the instant invention.

Referring now to FIG. 1, an exemplary imaging member from the Ruticon family is shown. Many modifications of the elements are known in the art, but generally imaging member 1 is comprised of a substrate 6 which is a transparent non-conductive layer having thereon a conductive transparent layer 5. Layer 4 is a photoconductive material which will allow the passage of more electrical charges into those regions which are exposed to light. Elastomer 3 may be of a class of elastomeric solid materials including both natural, such as natural rubbers and synthetic polymers which have rubber-like characteristics, i.e., elastic, and include materials such as styrene-butadiene, poly-butadiene, neoprene, butyl, polyisoprene, nitrile and ethylene propylene rubbers.

A thin continuous conductive layer 2 is placed on the surface of the elastomer, and is flexible enough to follow the deformations of the elastomer. In a preferred embodiment, this layer is highly reflective.

Power supply 7 provides DC voltages of one polarity to form a deformation image on the surface of the elastomer. The polarity required depends primarily upon the nature of the photoconductor. Power supply 7 must be capable of being turned off to erase the image, or undergo a shift in polarity to more rapidly erase the image. Supply 7 may also be AC or a combination AC and DC. The external electrical circuit may also include suitable switching means (not shown). Also not shown is an optional floodlight which may facilitate image erasure.

This type of image recorder can be read out using Schlieren optics. The positive image will be produced by diffracted light (higher orders), and the negative image will be produced by the undiffracted light (zero order).

When $I_p$, the positive image, and $I_n$, the negative image, are normalized in such a fashion that they are between zero and one, then $I_p = 1 - I_n$. This is a property that will be used in the masking process herein described.

Figure 2:
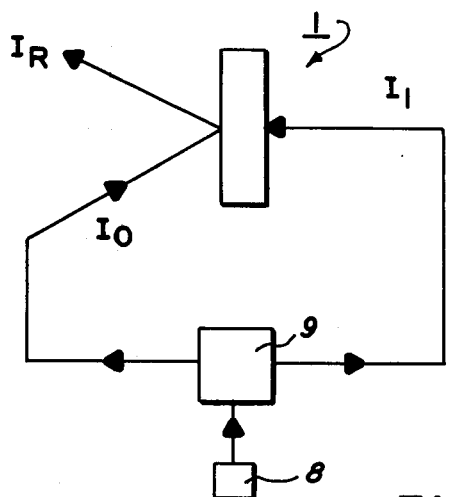
FIG. 2 is a schematic representation of the basic multiplication concept used in the instant invention.

FIG. 2 demonstrates the basic image multiplication principle used in the instant invention. Two images, in register with each other, are formed with quasi-collimated light on the two sides of the imaging member 1. For purposes of illustration, the "masking" image, the image that exposes the photoconductor and produces a phase image on the imaging member 1, is referred to as $I_1$, the "original" image, the image formed on the opposite side of the imaging member, is referred to as $I_o$ and the "read-out" image, the image produced by conventional Schlieren optics from only the zero diffracted order of light reflected from the imaging member, is referred to as $I_R$. Note that in the figure, 8 is a source of original input and 9 is a conventional beam splitter which separates the original into the two images $I_1$ and $I_o$. Member 9 may also be a dichroic filter which separates the original image into two color separation images.

The read-out image is equivalent to the product of the positive original image $I_o$ and the negative of the masking image, that is, $I_R = I_o (1 - I_1)$, as needed for masking. This result is obtained by using the image recorder property that the zero order readout gives an image that is 1 minus the image which exposes the photoconductor, i.e., the masking image. For simplicity it is assumed that the positive image of the image recorder is identical with the image which exposes it. The contrast of the positive (and negative) image can be controlled by adjusting the imaging member voltage and/or adding some of the higher diffracted orders to the zero order, and/or by adding some uniform light exposure, and/or by choosing the proper photoconductive material, and/or any of the methods known by those of skill in the art.

Figure 3:
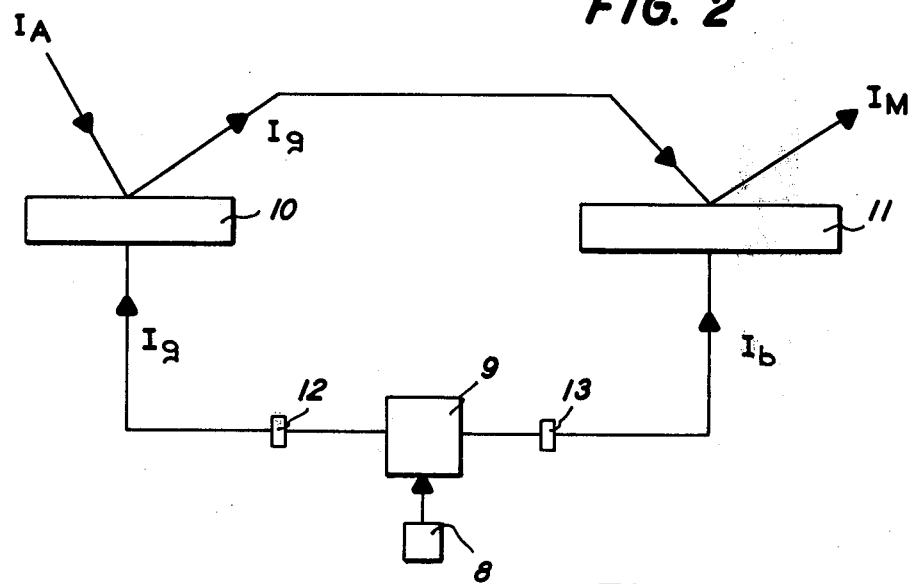
FIG. 3 is a schematic representation of a preferred embodiment of the inventive system.

Referring now to FIG. 3, a preferred embodiment of the instant invention, which by way of illustration provides yellow toned exposure, will be discussed. The two imaging members 10 and 11 used in this illustration are of the same structure as shown in FIG. 1. The colored original is illuminated with white light at image source 8 and separated into two identical images by beam splitter 9.

One of these two images, $I_g$, is directed through green light filter 12 to address imaging member 10. The other image $I_b$, is directed through blue filter 13 and then to imaging member 11. Imaging member 10 is illuminated with collimated actinic light, $I_A$, and by a Schlieren-type optical system (not shown), the image produced by the zero diffraction order (proportional to $(1-I_g)$, that is the negative image, is projected onto imaging member 11 in register with $I_b$. The image produced by the higher diffracted orders, $I_m$, reflected from member 11 is again equal to $I_b(1 - I_g)$.

In practice the output images from the two imaging members 10 and 11 have a different contrast than the input images. The contrast can be controlled by any of the methods set forth above to achieve the requred masking properties.

Inasmuch as $I_M$ is the masking image representative of a color component of the original, it is a useful end product in itself. However, it should be appreciated that this image will normally be projected onto a photosensitive recording medium through a halftoning screen or system to recreate at least a portion of the original. Apparatus to perform the recreation process can take many forms, for example, one masked image can be used to expose a photoconductor the image upon which is then toned with a pigment and transferred to a receiver. A second masked image can then be used to create a different color pigment image on the receiver. These steps may be repeated until the desired color combination is achieved. Single or multiple photosensitive recording mediums may be used depending upon machine requirements. The halftoning process may be further used, in conjunction with the masking process described to improve the quality of the final color copy.

Furthermore, when masking by more than one of the other colors is required or when the image storage properties of the electro-optical imaging device is used, the concept can be extended to utilize three or more different imaging devices (one for each color). The different sequential exposures to reproduce all colors can be achieved by either mechanically interchanging the color filters, or the imaging devices, and holding the other optical components fixed. In particular, when the storage properties of the image recorder are utilized, as few as three recorders are needed to perform the complete color separation and masking by more than one color for all three colors.

It will be understood that various other changes of the details, materials, steps, arrangements of parts and uses which have been herein described and illustrated in order to explain the nature of the invention will occur to and may be made by those skilled in the art, upon a reading of this disclosure, and such changes are intended to be included within the principles and scope of this invention.

For example, the invention is not limited to the Ruticon family of image recorders, but rather includes devices such as liquid crystals.

Furthermore, by using the nonlinear characteristics of the image recorder, highlight and shadow masking can also be achieved. This is a very desirable capability, allowing control of final copy detail content.

Also, it should be noted that masking by more than one color, as mentioned above, may be achieved by directing a third image from element 9 of FIG. 3 through a red filter onto a third image recorder. The readout from the third recorder then becomes $I_4$.

Even still further it is possible to use the structure of FIG. 2 to achieve single color masking of a transparency. Different color filters are merely inserted into the two outputs of member 9 to produce a masked readout at $I_R$.

Finally, it should be realized that the embodiment of FIG. 3 can be used to produce different color masking by merely changing the two filters 12 and 13.

Although specific components proportions and process steps have been stated in the above description of preferred embodiments of the invention, other suitable materials, proportions and process steps, as listed herein, may be used with satisfactory results and varying degrees of quality. In addition other materials which exist presently or may be discovered may be added to materials used herein to synergize, enhance or otherwise modify their properties.

What is claimed is:
1. A method of real-time color masking comprising the steps of:
   a. providing first and second substantially identical radiation images corresponding to an original object;
   b. directing said first radiation image through a first color filter selected from the group consisting of red, green and blue to provide a first color separation image and recording said first color separation image in a first optical recorder comprising a layer of photoconductive material adjacent a layer of voltage or current alterable light modulating material and means for establishing an electrical field across said layers;
   c. directing said second radiation image through a second color filter selected from the group consisting of red, green and blue, said second filter being a different color than said first filter, to provide a second color separation image and recording said second color separation image in a second optical recorder comprising a layer of photoconductive material adjacent a layer of voltage or current alterable light modulating material and means for establishing an electrical field across said layers;
   d. optically reconstructing one sense of the color separation image recorded in said first optical recorder; and
   e. using said optically reconstructed image from (d) to read out in reflection the opposite sense of the color separation image recorded in said second recorder, whereby the image reflected from said second recorder is effectively the product of the reflectance of the positive and the negative of the selected primary color components of the original image.

2. The method as defined in claim 1 wherein for each recorder, said voltage or current alterable light modulating material comprises an elastomer and said electrical field establishing means includes a deformable conductive layer adjacent said elastomer layer.

3. The method as defined in claim 2 and further including the steps of projecting the image reflected from said second optical recorder upon a photosensitive element and forming a visible image upon said photosensitive element.

4. The method as defined in claim 3 and further including repeating each step at least one additional time with a different combination of said first and second color filters.

5. The method as defined in claim 3 and further including repeating each step at least one additional time with a different combination of said first and second color filters, wherein each image reflected from said second optical recorder is projected upon a separate photosensitive element.

6. The method as defined in claim 5 wherein each photosensitive element comprises a photoconductive layer, wherein the step of forming a visible image includes depositing differently colored marking material on each photoconductive layer and further including the steps of transferring said differently colored visible images to a receiver.

7. The method as defined in claim 6 wherein said differently colored visible images are transferred in registration to the same receiver.

8. The method as defined in claim 2 wherein said one sense in step (d) is negative and said opposite sense in step (e) is positive.

9. The method as defined in claim 2 and further including varying the contrast of the images recorded by each said optical recorder to adjust the masking characteristics.

10. The method as defined in claim 2 wherein providing said first and second color separation images includes passing a radiation image corresponding to the original object through a dichroic filter.

11. The method as defined in claim 1 and further including the steps of
   providing a third radiation image corresponding to said original object and substantially identical to said first and second radiation images;
   directing said third radiation image through a third color filter selected from the group consisting of red, green and blue, said third filter being a different color than said first and second color filters, to provide a third color separation image and recording said third color separation image in a third optical recorder comprising a layer of photoconductive material adjacent a layer of voltage or current alterable light modulating material and means for establishing an electrical field across said layers; and
   optically reconstructing said one sense of the color separation image recorded in said third optical recorder and using said optically reconstructed image from said third optical recorder to optically reconstruct said one sense of the color separation image recorded in said first optical recorder, whereby the image reflected from said second optical recorder is effectively the product of the reflectance of two identical image senses and the opposite sense of the selected primary color components of the original image.

12. The method as defined in claim 11 wherein said one sense is positive and said opposite sense is negative.

13. The method as defined in claim 11 wherein said one sense is negative and said opposite sense is positive.

14. A method of real-time color masking comprising the steps of:
 a. providing first, second and third substantially identical radiation images corresponding to an original object;
 b. directing said first, second and third radiation images through red, green, and blue color filters, respectively to provide red, green and blue color separation images and recording each said color separation image in one of first, second and third optical recorders, each optical recorder comprising a layer of photoconductive material adjacent a layer of voltage or current alterable light modulating material and means for establishing an electrical field across said layers; and
 c. multiplying an image of a first sense of the color separation image recorded by one of said optical recorders by the product of the opposite sense of the color separation images recorded by said other two optical recorders to thereby mask the image of said first sense with the images of said opposite sense.

15. The method as defined in claim 14 wherein the masked image obtained in step (c) is projected onto a photosensitive element and a visible image is formed.

16. The method as defined in claim 15 wherein for each recorder, said voltage or current alterable light modulating layer comprises an elastomer and said electrical field establishing means includes a deformable conductive layer adjacent said elastomer layer.

17. The method as defined in claim 16 wherein said first sense is negative and said opposite sense is positive.

18. The method as defined in claim 17 wherein said first sense is positive and said opposite sense is negative.

19. A method for real-time color masking comprising the steps of:
 a. providing first and second substantially identical positive radiation images corresponding to an original object;
 b. directing said first radiation image through a first color filter selected from the group consisting of red, green, and blue to provide a first color separation image and recording said first color separation image in an optical recorder comprising a layer of photoconductive material adjacent a layer of voltage or current alterable light modulating material and means for establishing an electrical field across said layers;
 c. directing said second radiation image through a second color filter selected from the group consisting of red, green, and blue, said second filter being a different color than said first filter, to provide a second color separation image; and
 d. using said second color separation image to read out in reflection the negative sense of the color separation image recorded in said optical recorder.

20. The method as defined in claim 19 wherein said voltage or current alterable light modulating material comprises an elastomer and said electrical field establishing means includes a deformable conductive layer adjacent said elastomer layer.

* * * * *